(12) United States Patent
Lelieur et al.

(10) Patent No.: US 7,632,347 B2
(45) Date of Patent: Dec. 15, 2009

(54) ULTRAMARINE PIGMENT SYNTHESIS PROCESS

(75) Inventors: Jean-Pierre V. Lelieur, Lambersart (FR); Christian L. Duhayon, Ploegsteert (BE); Noëlle S. Hautecoeur, Lambersart (FR); Antoine M. Demortier, Saint Andre Lez Lille (FR); Bertrand J. Lede, Lille (FR); Patrice J. Coopman, Rekkem (BE); Patrick Leghie, Templeuve (FR)

(73) Assignee: Holliday Pigments SA, Comines (FR)

( * ) Notice: Subject to any disclaimer, the term of this patent is extended or adjusted under 35 U.S.C. 154(b) by 0 days.

(21) Appl. No.: 11/596,192

(22) PCT Filed: May 9, 2005

(86) PCT No.: PCT/FR2005/001151

§ 371 (c)(1),
(2), (4) Date: Nov. 13, 2007

(87) PCT Pub. No.: WO2005/121256

PCT Pub. Date: Dec. 22, 2005

(65) Prior Publication Data

US 2008/0257219 A1    Oct. 23, 2008

(30) Foreign Application Priority Data

May 11, 2004    (FR) .................... 04 05103

(51) Int. Cl.
*C09C 1/32*    (2006.01)

(52) U.S. Cl. .................... 106/414; 423/511; 423/566.2

(58) Field of Classification Search ................ 106/414; 423/511, 566.2
See application file for complete search history.

(56) References Cited

U.S. PATENT DOCUMENTS 2,535,057 A    12/1950   Gessler et al.
2,544,693 A *  3/1951    Kumins ...................... 106/414
2,544,695 A *  3/1951    Kumins ...................... 106/414
2,738,288 A *  3/1956    Kumins ...................... 106/414
2,759,844 A *  8/1956    Kumins ...................... 106/414

FOREIGN PATENT DOCUMENTS

JP    54-142238 A   * 11/1979

OTHER PUBLICATIONS

Kowalak et al, "Synthesis of Ultramarine From Synthetic Molecular Sieves", Colloids and Surfaces A:Physiochemical and Engineering Aspects 101, pp. 179-195 (1995). [no month].*
Kowalak et al, "Zeolite Matrices For Pigments", Studies in Surface Science and Catalysis, vol. 125, pp. 753-760 (1999). [no month].*
Database CA 'Online!, Chemical Abstracts Service, Columbus, Ohio, US; Kowalak, S., et al.: *Zeolite matrices for pigments*, XP002313628, accession No. 132:209172; and *Studies in Surface Science and Catalysis*, 125 (Porous Materials in Environmentally Friendly Processes), 753-760 Coden: SSCTDM; ISSN: 0167-2991, 1999.
Database CA 'Online!, Chemical Abstracts Service, Columbus, Ohio, US; Kowalak, S. et al.: *Synthesis of ultramarine from synthetic molecular sieves*, XP002313629, Database accession No. 123:304993, & *Colloids and Surfaces, A: Physicochemical and Engineering Aspects*, 101(2/3), 179-85 Coden: CPEAEH; ISSN: 0927-7757, 1995.

* cited by examiner

*Primary Examiner*—Anthony J Green
(74) *Attorney, Agent, or Firm*—Kenyon & Kenyon LLP

(57)    ABSTRACT

The present invention relates to an ultramarine pigment synthesis process which includes a calcination step in the absence of air of a mixture including zeolite A, possibly sodium sulfide and/or sulfur, possibly hydroxide ions, and polysulfides of composition $Na_2S_n$, n being a number greater than 1, the product resulting from the calcination reaction being cooled in the absence of air, leading to obtaining a raw product which includes the synthesized ultramarine pigment, polysulfides and possibly sulfur. The $Na_2S_n$ polysulfides taking part in the calcination reaction come at least in part from the recycling of the polysulfides and possibly of the sulfur present in excess in the aforesaid raw product.

15 Claims, 1 Drawing Sheet

ULTRAMARINE PIGMENT SYNTHESIS PROCESS

This is a 371 national phase application of PCT/FR2005/001151 filed 9 May 2005, claiming priority to French Patent Application No. FR 0405103 filed 11 May 2004, the contents of which are incorporated herein by reference.

TECHNICAL FIELD

The ultramarine pigments are sodium aluminum silicates of sodalite structure which contain sulfur species. The sodalite of formula $Na_6(Al_6Si_6O_{24})$ is formed of juxtaposed sodalite cages (truncated cuboctahedra). NaX salts can be inserted in this compact structure. The ultramarine pigment chromophores are polysulfide radicals $S_3^-$ (blue) and $S_2^-$ (yellow). These chromophores are inserted in the sodalite cages in the form of $NaS_3$ and $NaS_2$ salts. The hue of the pigments is related to the concentration of these chromophores.

BACKGROUND

The ultramarine blue pigment is the synthetic form of the semi-precious stone lapis lazuli. For centuries, a blue pigment has been prepared from this stone. This very high-quality pigment was, however, very expensive and so its chemical synthesis was sought. It was only in 1828 that J. B. Guimet discovered the ultramarine blue pigment synthesis process.

The current synthesis process for the ultramarine blue pigment, based on the process discovered by Guimet, consists of heating a mixture of metakaolin, sodium carbonate, sulfur and a reducer. These reagents are mixed in the desired proportions, then are calcined in furnaces. The temperature cycle is comprised of several steps: heating to 800° C. in the absence of air, followed by an oxidation step at a lower temperature.

This process produces ultramarine blue pigments of good quality, but presents several disadvantages:
- the high temperatures and the duration of synthesis make this process costly in energy;
- during heating in the absence of air and during cooling, a large quantity of gas is released, namely sulfur dioxide and carbon dioxide; $SO_2$ must be treated in order to adhere to local environmental protection standards, which increases the cost of production;
- the raw pigment wash water has a high COD (chemical oxygen demand) due to the presence of residual polysulfides and sodium thiosulfate. To adhere to local environmental protection standards, this water must be treated before being discharged;
- the quality of the blue pigment synthesized varies as a function of the various parameters and as a function of the temperature cycle, in particular during oxidation.

Shortly after the discovery of the synthesis of the ultramarine blue pigment, pink and green pigments having the same structure as ultramarine blue and also containing sulfur species were synthesized.

Ultramarine green was synthesized by the calcination, in the absence of air, of raw materials similar to those used for the manufacture of ultramarine blue. During its production, problems were encountered related to the discharge of the raw pigment wash water which contains a large quantity of polysulfides.

BRIEF DESCRIPTION

The present invention makes it possible to overcome the drawbacks presented by the existing ultramarine pigment synthesis processes. The aim of the present invention is to propose a synthesis process for ultramarine green and blue pigments by calcination which takes place in a single step and which does not release polluting gases.

According to a first aspect, the invention relates to an ultramarine pigment synthesis process by the calcination in the absence of air of a mixture comprised of zeolite A, sodium sulfide and sulfur, characterized in that:
- the zeolite A is dried in advance to a water content lower than 10%, preferably lower than 1% (by weight), and
- the reaction medium is free of water.

According to various embodiments, the synthesis process exhibits the following characteristics, in combination if necessary:
- the reaction mixture includes anhydrous sodium sulfide;
- the calcination temperature lies between 500° C. and 1000° C.;
- the dried zeolite is kept away from moisture until calcination;
- when the reaction mixture is characterized by:
  - a S/Na* weight ratio ranging between 0.87 and 1.74 (Na* being Na of $Na_2S$);
  - the following weight percentages:
    - $Na_2S$/zeolite>9%;
    - S/zeolite>1%;
  - the implementation of the synthesis process starting from the aforesaid mixture leads in this case to obtaining an ultramarine green pigment;
- when the reaction mixture is characterized by:
  - a S/Na* weight ratio higher than 1.74;
  - the following weight percentages:
    - $Na_2S$/zeolite>9%;
    - S/zeolite>5.6%;
  - the possible inclusion of hydroxide ions, the hydroxide/zeolite ion weight percentage lying between 0% and 5%;
  - the implementation of the synthesis process starting from the aforesaid mixture leads in this case to obtaining an ultramarine blue pigment;
- the calcination time is at least 10 h for the ultramarine green pigments and at least 12 h for the ultramarine blue pigments;
- the calcination reaction takes place in a leakproof vessel under a vacuum or under an inert gas.

According to a second aspect, the invention relates to an ultramarine pigment synthesis process which is comprised of a step of calcining, in the absence of air, a mixture including zeolite A, possibly sodium sulfide and/or sulfur, possibly hydroxide ions, and polysulfides of the composition $Na_2S_n$, n being a number greater than 1, the product resulting from the calcination reaction being cooled in the absence of air, leading to obtaining a raw product which includes the synthesized ultramarine pigment, polysulfides and possibly sulfur. In this case, the synthesis process exhibits the following characteristics, in combination if necessary:
- the $Na_2S_n$ polysulfides taking part in the calcination reaction come at least in part from the recycling of the polysulfides and possibly of the sulfur present in excess in the aforesaid raw product, the aforesaid recycling is comprised of the following steps, preferably carried out in the absence of air:

solubilization of the polysulfides and possibly of the sulfur present in the raw product by washing the aforesaid raw product with a non-aqueous solvent;

separation of the synthesized ultramarine pigment in suspension in the aforesaid solvent loaded in polysulfides and possibly sulfur;

evaporation of the aforesaid solvent making it possible to obtain crystallized polysulfides and possibly sulfur.

the solvent capable of solubilizing the polysulfides present in the raw product is selected from the group: acetone, acetonitrile, ammonia, carbon disulfide, dimethylsulfoxide, ethanol, methanol, pyridine, tetrahydrofuran, dimethylformamide, propanol;

the aforesaid solvent is used preferably in an anhydrous state;

the evaporated solvent is recovered and reused in the process.

The ultramarine pigment present in suspension in the aforesaid solvent is separated by filtration or by any other appropriate process. The pigment thus separated either is rewashed with the same solvent according to the same process, or dried in order to eliminate any trace of the solvent.

According to a third aspect, the invention relates to an ultramarine pigment obtained by the implementation of the synthesis process described, the aforesaid ultramarine pigment exhibiting an iron content less than or equal to 200 ppm.

BRIEF DESCRIPTION OF THE DRAWINGS

Referring to the drawings, which form a part of the disclosure.

DETAILED DESCRIPTION

Figure 1:
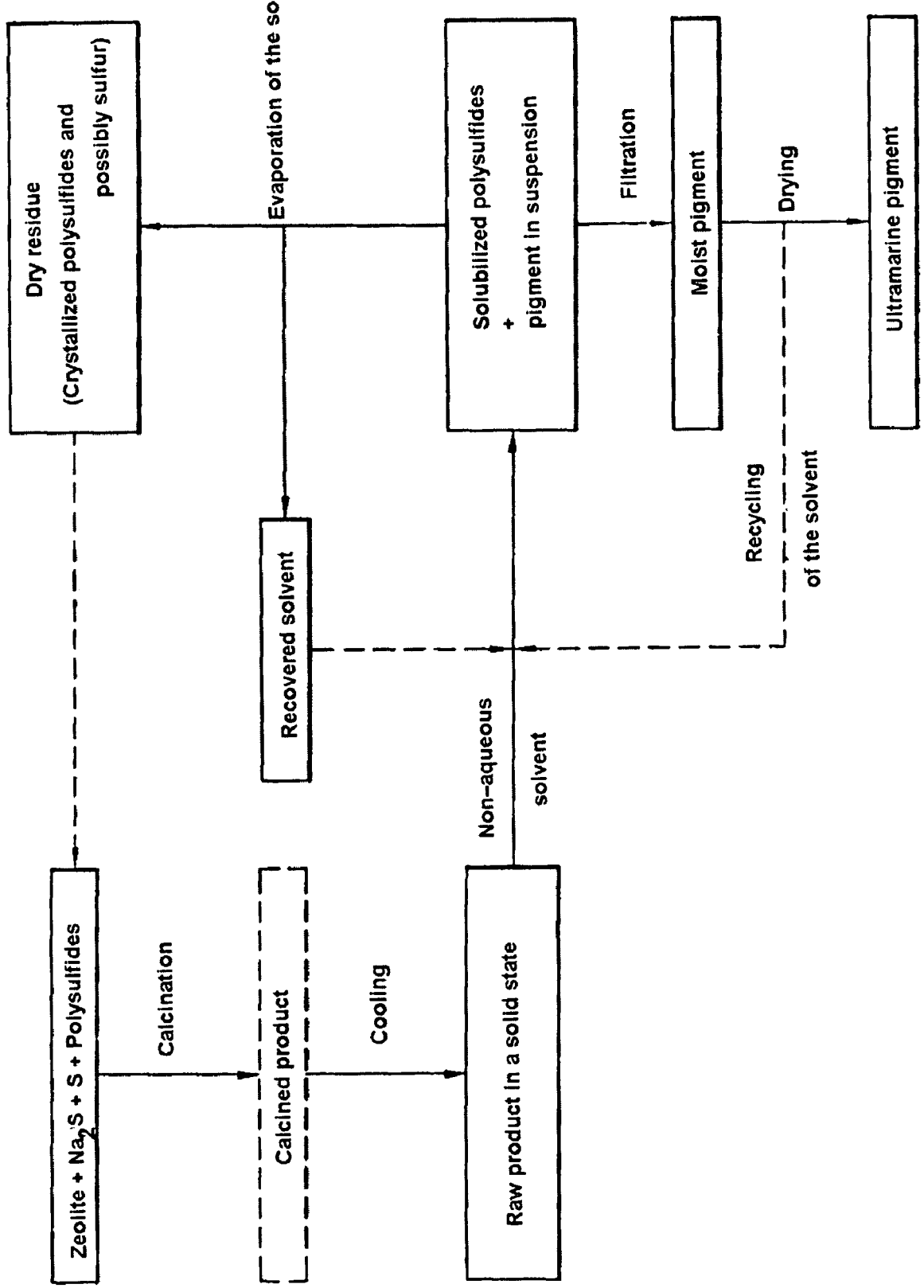
FIG. 1 shows a flow chart illustrating steps of an ultramarine pigment synthesis process in accordance with certain embodiments of the present invention.

The invention will now be described in detail.

The various steps of the synthesis process according to the invention take place in the absence of air. In an alternative embodiment, the synthesis process takes place under an inert atmosphere, in a leakproof vessel. In another alternative embodiment, the synthesis process takes place in an open vessel under continuous inert gas flux. It is however possible to carry out all of the steps of the process under a vacuum or under dry air in leakproof vessels. Working conditions that include the absence of air throughout the synthesis process cause a drastic reduction in the formation of sulfur dioxide, with the excess sulfur being transformed for the most part into polysulfides.

The reaction mixture is comprised of, as reagents:

i) Commercially available zeolite A dried in advance. Preferably, zeolite 4A is used. The drying step is necessary because un-dried zeolite A contains approximately 22% water (by weight). The applicant has noted, and it is one of the merits of the invention, that the use of a dried zeolite containing less than 10% water, preferably less than 1% water (by weight), in the ultramarine pigment synthesis process leads to obtaining pigments of intense color without the significant release of gas.

ii) Commercially available sodium sulfide in anhydrous form. The applicant has noted, and it is another merit of the invention, that the use of anhydrous sodium sulfide in the place of hydrated forms, which have been used up to now for the synthesis of ultramarine pigments, contributes to obtaining pigments of intense color and to the reduction of the quantities of gas released by keeping the reaction medium free of water.

Without seeking to understand the intrinsic causes of the effects described in points i and ii, it can be supposed that during heating the residual water contained in the zeolite A leaves the structure in the reaction medium where it hydrolyzes part of the polysulfides, which decreases the quantity of insertable chromophores. Water can also hydrolyze the chromophores in the cages. Conversely, the absence of water in the reaction medium during calcination encourages the insertion of the chromophores $S_3^-$ and $S_2^-$ into zeolite A and consequently the obtaining of a higher-quality pigment. In addition, the absence of water in the calcination medium, combined with the absence of oxygen, prevents the formation of various gases ($SO_2$, $H_2S$).

iii) Commercially available sulfur.

iv) Polysulfides or, in an alternative embodiment, a mixture of polysulfides and sulfur. These compounds are obtained, at least in part, by solubilization in a non-aqueous solvent, with the polysulfides and possibly the sulfur present in excess in the raw product resulting after the cooling of the calcination reaction product followed by an elimination step of the pigment in suspension and evaporation of the aforesaid solvent. After the determination of the nature of the solid polysulfides obtained (the least-reduced, highest-degree polysulfide that exists in a solid state at ambient temperature is $Na_2S_5$; for higher stoichiometries, after evaporation of the solvent, a mixture of polysulfides and of sulfur is obtained), they are mixed with zeolite and possibly with sodium sulfide and/or sulfur for a new synthesis.

v) Hydroxide ions. The addition of hydroxide ions, in the form of a hydroxide salt (for example: NaOH, LiOH, KOH, $Ca(OH)_2$, $Mg(OH)_2$), makes it possible to decrease the duration of calcination or the calcination temperature, in the case of the synthesis of ultramarine blue pigments. However, the more hydroxide ions there are, the lower the quality of the pigment. The hydroxide ion/zeolite weight percentages used in the calcination mixture lie between 0% and 5%. As an example, the calcination step of the mixture at 700° C. in the absence of hydroxide ions has a duration greater than 72 h, whereas the addition of NaOH to said mixture before calcination under the same conditions reduces this duration to less than 24 h.

The synthesis process makes it possible to obtain, in a single step (of calcination), ultramarine pigments of good quality.

Prior to calcination, the zeolite A is dried under vacuum conditions ensuring a weight content in water of less than 10%, preferably less than 1%. For example, a temperature greater than 350° C., drying under a vacuum (pressure less than $10^{-3}$ Torr) and a duration greater than 12 h leads to obtaining a zeolite with a low water content.

Other conditions are also appropriate: drying under air, under a less-powerful vacuum or under an inert gas, as well as the use of any other means of drying that makes it possible to reduce the zeolite water content below 10%.

Once dried, the zeolite is maintained away from moisture.

The reagents that are part of the composition of the calcination mixture, namely zeolite, sodium sulfide and sulfur (optionally a hydroxide), are mixed in the absence of air. If necessary, the reagents can be ground at the same time they are mixed.

The proportion of the reagents depends on whether blue or green pigment is desired to be obtained. A green pigment is obtained from a S/Na* weight ratio ranging between 0.87 and 1.74 (Na* being Na of $Na_2S$), with the following weight percentages: $Na_2S$/zeolite>9% and S/zeolite>1%. A blue pigment is obtained from a S/Na* weight ratio greater than 1.74, with the following weight percentages: $Na_2S$/zeolite>9% and S/zeolite>5.6%. For high S/Na* ratios, the pigments obtained are of good quality; however, the proportion of excess polysulfides increases.

If necessary, the mixture of reagents can be compacted in the absence of air.

The calcination step consists of heating the aforesaid mixture, compacted or not, in an vessel at high temperature in the absence of air. The calcination temperature varies between 500° C. and 1000° C. to obtain ultramarine blue and green pigments. For example, with a zeolite containing less than 1% water, for a blue pigment, approximately 12 h at 850° C. are needed; at 750° C. approximately 48 h are needed; at 700° C. between 72 h and 96 h are needed. For a green pigment, approximately 10 h of calcination at 750° C. are needed; at 650° C. between 20 h and 30 h are needed. The lower the temperature, the longer the duration.

The product obtained at the end of calcination is cooled or allowed to cool in the absence of air. The product obtained after cooling, called the raw product, contains the green or blue pigment and polysulfides and possibly sulfur, in excess.

In an alternative embodiment, the synthesis process makes it possible to obtain ultramarine pigments by using as reagents in the calcination reaction, in addition to zeolite, possibly sodium sulfide and/or sulfur and possibly hydroxide ions, a mixture of polysulfides and possibly sulfur obtained at least in part by the recycling of the polysulfides and possibly of the sulfur present in excess in the raw product.

The recycling of the polysulfides and possibly of the sulfur present in the raw product is comprised of the following steps, illustrated in FIG. 1:

Solubilization of the aforesaid polysulfides and possibly sulfur by washing with a non-aqueous solvent in the absence of air. The solvent must not harm the calorimetric characteristics of the pigment (which remains in suspension) and must be able to solubilize the excess polysulfides and sulfur (which were not inserted into the sodalite cages) without reacting with the solvent (solvation or oxidation). Several washings may be necessary to solubilize all the polysulfides and the sulfur. The non-aqueous solvent is selected from the group: acetone, acetonitrile, ammonia, carbon disulfide, dimethylsulfoxide, ethanol, methanol, pyridine, tetrahydrofuran, dimethylformamide, propanol. It is preferable to use an anhydrous solvent and to stir during the washing.

Separation of the pigment present in suspension in the non-aqueous solvent loaded in sulfur and in polysulfide. This separation can be carried out by filtration or any other suitable technique. Preferably, it should be done in the absence of air.

Evaporation of the solvent, making it possible to obtain crystallized polysulfides and possibly sulfur in the form of a dry, solvent-free residue. The selected solvent must be capable of evaporating without oxidizing the polysulfides or forming solvates. After determination of the mean degree of reduction of the aforesaid residue for the adjustment of reagent quantities, the polysulfides and possibly the sulfur are mixed with zeolite, possibly with sodium sulfide and/or sulfur and possibly with a hydroxide for a new synthesis. In addition, the solvent recovered after evaporation is reused in recycling.

Separately, the pigment, moist with the solvent, is either rewashed with the same solvent if necessary or is dried directly in order to eliminate any trace of the solvent.

The following examples of embodiments, which are non-restrictive, illustrate the ultramarine pigment synthesis process in greater detail.

EXAMPLE 1

Best Mode for the Green Pigment 50.6 g of zeolite 4A are heated under air at 500° C. for 48 h. 40 g of dried zeolite are obtained which are preserved away from moisture. 40 g of dried zeolite A, 11 g of anhydrous $Na_2S$ and 4.5 g of sulfur are mixed in the absence of air. This mixture is heated in a leakproof vessel filled with argon at 750° C. for 48 h. After cooling, the raw product obtained is washed with ethanol. The washed product is intense green.

EXAMPLE 2

50 g of dried zeolite A, 13.75 g of anhydrous $Na_2S$ and 28 g of sulfur are mixed and ground in the absence of air. The mixture is heated in a leakproof vessel filled with argon at 750° C. for 48 h. The raw product obtained after cooling is washed with water. The washed product is intense greenish-blue.

EXAMPLE 3

Best Mode for the Blue Pigment 28 g of dried zeolite A, 7.7 g of anhydrous $Na_2S$ and 22.12 g of sulfur are mixed and ground in the absence of air. The mixture is heated in a leakproof vessel under nitrogen at 750° C. for 48 h then allowed to cool. After washing the raw product with water, an intense reddish-blue pigment is obtained.

EXAMPLE 4

For each of the pigments obtained in examples 2 and 3, 2 g of $TiO_2$, 0.4 g of pigment and 0.7 g of linseed oil are mixed together. The paint thus formed is spread over a support in the form of a film of a thickness considered infinite and the calorimetric parameters are determined according to the CIELAB 1976 system:

|  | Ex. 2 | Ex. 3 |
| --- | --- | --- |
| L* | 68.12 | 68.16 |
| C* | 33.41 | 35.37 |
| h* | 246.2 | 266.5 |

EXAMPLE 5

The procedure is the same as in example 2 and the raw product is washed with water in a proportion of 1 kg/l. The COD of the wash water is measured: 346,700 mg/l of $O_2$ is obtained.

EXAMPLE 6

The procedure is the same as in example 2 and the raw product is washed three times in ethanol (the volume of ethanol is greater than 4 l/kg of pigment). The pigment is dried under a vacuum at 100° C. A last water wash is performed in a proportion of 1 kg/l and the COD of the wash water is measured: 1,990 mg/l of $O_2$ is obtained.

EXAMPLE 7

50 g of dried zeolite A, 13.75 g of anhydrous $Na_2S$, 28 g of sulfur and 1.5 g of NaOH are mixed and ground in the absence of air. The mixture is heated under a vacuum in a leakproof vessel at 600° C. for 96 h. After cooling and washing with water, the pigment is intense blue.

According to a third aspect, the invention relates to an ultramarine pigment obtained by the implementation of the synthesis process described, the aforesaid ultramarine pigment exhibiting an iron content less than or equal to 200 ppm.

The known ultramarine pigments are characterized by an iron content near 1000 ppm due to the relatively high iron content of the raw materials used in the synthesis.

The ultramarine pigment synthesis process of the present invention has a number of advantages:

- it makes it possible to obtain ultramarine blue and green pigments whose hue and tinting strength are comparable to those of industrial pigments;
- it makes it possible to synthesize a blue pigment or a green pigment by modifying the proportions of the reagents only;
- it makes it possible to recycle the raw materials and to reuse them in the synthesis of ultramarine pigments;
- it makes it possible to synthesize an ultramarine pigment without pollutant discharge in the form of gas or liquid;
- it makes it possible to synthesize an ultramarine blue pigment under a vacuum, under dry air or under an inert atmosphere, in a single step.

What is claimed is:

1. An ultramarine pigment synthesis process by calcination, in a single step and in the absence of air, of a mixture comprised of zeolite A, sodium sulfide and sulfur, comprising:
   drying the zeolite A in advance to a water content lower than about 10% by weight,
   wherein a reaction medium free of water is utilized.

2. A process according to claim 1, wherein the aforesaid mixture includes zeolite A, and sodium polysulfides of the composition Na2Sn, n being a number greater than 1, a product resulting from the calcination reaction being cooled or allowed to cool in the absence of air, leading to obtaining a raw product which includes the synthesized ultramarine pigment, polysulfides, wherein the Na2Sn, polysulfides taking part in the calcination reaction come at least in part from the recycling of the polysulfides present in excess in the raw product.

3. A process according to claim 1, wherein the reaction mixture includes anhydrous sodium sulfide.

4. A process according to claim 1, wherein a temperature of the calcination lies between 500° C. and 1000° C.

5. A process according to claim 1, wherein the dried zeolite is kept away from moisture until calcination.

6. A process according to claim 1, wherein the reaction mixture comprises:
   a S/Na* weight ratio ranging between 0.87 and 1.74 (Na* being Na of Na2S);
   the following weight percentages:
     Na2S/zeolite>9%; and
     S/zeolite>1%.

7. A process according to claim 6, wherein the calcination time is at least 10 h.

8. A process according to claim 1, wherein the reaction mixture comprises:
   a S/Na* weight ratio greater than 1.74;
   the following weight percentages:
     Na2S/zeolite>9%; and
     S/zeolite>5.6%.

9. A process according to claim 8, wherein the calcination time is at least 12 h.

10. A process according to claim 1, wherein the reaction mixture includes hydroxide ions, the hydroxide ion/zeolite weight percentage lying between 0% and 5%.

11. A process according to claim 1, wherein the calcination reaction takes place in a leak-proof vessel under a vacuum, under an inert gas or under dry air, or in an open vessel under continuous inert gas flux.

12. A process according to claim 2, wherein the recycling of the polysulfides an present in the raw product includes the following steps, which are carried out in the absence of air:
   solubilization of the polysulfides present in the raw product by washing the aforesaid raw product with a non-aqueous solvent;
   separation of the synthesized ultramarine pigment in suspension in the solvent loaded in polysulfides; and
   evaporation of the solvent making it possible to obtain a mixture of polysulfides and of sulfur in a solid form.

13. A process according to claim 12, wherein the solvent capable of solubilizing the polysulfides present in the raw product is selected from the group consisting of: acetone, acetonitrile, ammonia, carbon disulfide, dimethylsulfoxide, ethanol, methanol, pyridine, tetrahydrofuran, dimethylformamide, and propanol.

14. A process according to claim 13, wherein the solvent is used in an anhydrous state.

15. A process according to claim 12, wherein the evaporated solvent is recovered and recycled in the process.

* * * * *

UNITED STATES PATENT AND TRADEMARK OFFICE
CERTIFICATE OF CORRECTION

PATENT NO. : 7,632,347 B2  Page 1 of 1
APPLICATION NO. : 11/596192
DATED : December 15, 2009
INVENTOR(S) : Jean-Pierre V. Lelieur et al.

It is certified that error appears in the above-identified patent and that said Letters Patent is hereby corrected as shown below:

| Column | Line | |
|---|---|---|
| 5 | 10 | Before "vessel" change "an" to --a--. |
| 6 | 58 | Change "1 kg/l" to --1kg/L--. |
| 6 | 59 | Change "mg/l" to --mg/L--. |
| 6 | 66 | Change "4 l/kg" to --4 L/kg--. |
| 7 | 1 | Change "1 kg/l" to --1 kg/L--. |
| 7 | 2 | Change "mg/l" to --mg/L--. |
| 7 | 43 | Change "Na2Sn" to --$Na_2S_n$--. |
| 7 | 47 | Change "Na2Sn" to --$Na_2S_n$--. |
| 8 | 8 | Change "Na2S" to --$Na_2S$--. |
| 8 | 10 | Change "Na2S" to --$Na_2S$--. |
| 8 | 19 | Change "Na2S" to --$Na_2S$--. |
| 8 | 31 | Before "present" delete "an". |

Signed and Sealed this

Ninth Day of March, 2010

David J. Kappos
*Director of the United States Patent and Trademark Office*